Jan. 30, 1934.  E. HOROWICZ  1,945,401
ELECTRIC VALVE CONVERTING SYSTEM
Filed Oct. 1, 1932
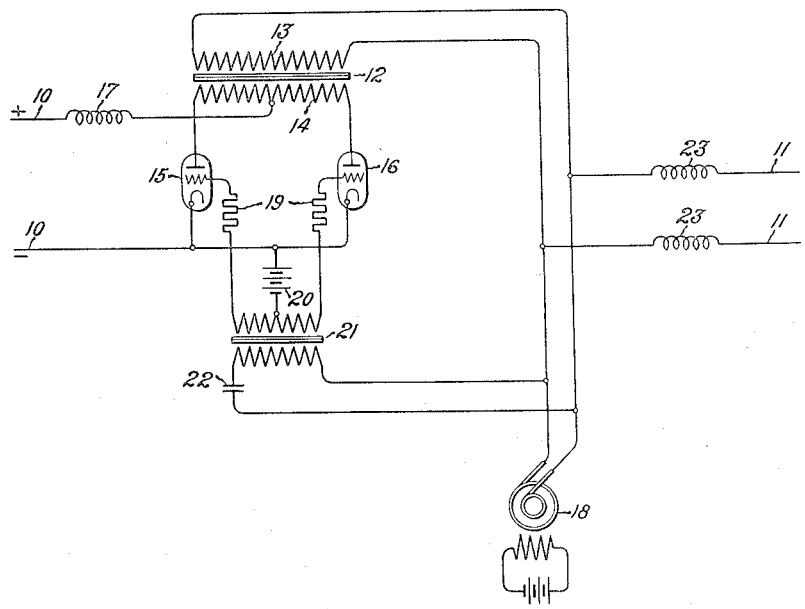
Inventor:
Eugen Horowicz,
by Charles V. Tullar
His Attorney.

Patented Jan. 30, 1934

1,945,401

UNITED STATES PATENT OFFICE 1,945,401

ELECTRIC VALVE CONVERTING SYSTEM

Eugen Horowicz, Berlin-Halensee, Germany, assignor to General Electric Company, a corporation of New York Application October 1, 1932, Serial No. 635,773, and in Germany October 14, 1931

3 Claims. (Cl. 175—363)

My invention relates to electric valve converting systems and more particularly to such systems adapted to transmit energy from a direct current supply circuit to an alternating current load circuit.

Of the several electric valve converting apparatus heretofore proposed for transmitting energy from a direct current supply circuit to an alternating current load circuit, the parallel type inverter employing valves of the vapor electric discharge type has found considerable favor because of its stability, apparatus economy and efficiency. With this type of apparatus it is necessary to supply some means for supplying a commutating voltage to transfer the current between the electric valves and in many instances it has been found convenient to supply this commutating voltage from a synchronous dynamo-electric machine connected in parallel with the alternating current circuit of the apparatus which may or may not supply energy to the load circuit in parallel with the inverting apparatus. With such an arrangement, however, a short circuit on the alternating current load circuit tends to reduce the terminal voltage of the synchronous machine to substantially zero, that is the commutating voltage, and thus produce a short circuit on the direct current supply circuit due to the fact that there is no means available for transferring the current between the electric valves.

It is an object of my invention, therefore, to provide an improved electric valve converting system of the type described above which will overcome the above mentioned disadvantages of the arrangements of the prior art and which will be simple and reliable in operation.

It is another object of my invention to provide an improved electric valve converting system including a vapor electric valve inverting apparatus and a dynamo-electric machine operating in parallel to supply an alternating current load circuit in which a substantial commutating voltage for the inverting apparatus will be maintained under abnormal load conditions tending to reduce the commutating voltage to zero.

In accordance with my invention, there is provided a vapor electric valve inverting apparatus interconnecting a direct current supply circuit and an alternating current load circuit and in parallel to the alternating current circuit of the inverting apparatus there is connected a dynamo-electric machine for supplying the commutating voltage of the inverting apparatus. Between the alternating current load circuit and the parallel connected inverting apparatus and dynamo-electric machine there is connected a reactance device which is effective to maintain a substantial terminal voltage on the dynamo-electric machine even under short circuit conditions on the alternating current load circuit. This reactance means is so proportioned that the magnitude of the terminal voltage of the dynamo-electric machine under short circuit conditions will be sufficient to commutate the current between the electric valves of the inverting apparatus.

For a better understanding of my invention together with other and further objects thereof, reference is had to the following description taken in connection with the accompanying drawing and its scope will be pointed out in the appended claims. The single figure of the accompanying drawing illustrates my invention as embodied in a single phase parallel inverting system.

Referring now to the drawing, there is illustrated an arrangement for transmitting energy from a direct current supply circuit 10 to an alternating current load circuit 11. This arrangement includes an electric valve inverting apparatus of the parallel type comprising a transformer 12 provided with a secondary winding 13 connected to the alternating current circuit 11 and with a primary winding 14 having an electrical midpoint connected to the positive side of the direct current circuit and with end terminals connected to the other side of the direct current circuit through electric valves 15 and 16. A current smoothing reactor 17 is preferably included in the direct current circuit as illustrated. Electric valves 15 and 16 are each provided with an anode, a cathode and a control grid and are of the vapor electric discharge type in which the starting of current in a valve is determined by the potential on its control grid, but in which the current can be interrupted in a valve only by reducing its anode potential below the critical value. In order periodically to depress the anode potentials of the valves 15 and 16 below their cathode potentials, and thus commutate the current between the valves 15 and 16, there is provided a synchronous dynamo electric machine 18 connected in parallel with the winding 13. This machine may or may not supply part of the energy to the alternating current circuit 11 as desired. In order periodically to render the valves 15 and 16 alternately conductive and nonconductive and thus complete the commutating operation, the grids of these valves are connected to their common cathode circuit through current limiting resistors 19, a negative bias battery 20 and opposite halves of the secondary winding of the grid transformer 21, the primary winding of which is connected to the alternating current circuit through a phase advancing condenser 22. In order to maintain a substantial commutating voltage under abnormal load conditions on the alternating current circuit 11, reactance devices 23 are interposed in the connections between the alternating current circuit 11 and the parallel connected inverting apparatus and dynamo-electric machine 18.

The general principles of operation of the above described inverting apparatus will be well understood by those skilled in the art. In brief, if one of the electric valves, for example the valve 15, be initially made conductive, current will flow through the left hand portion of the winding 14 and the valve 15 generating one half cycle of alternating current in the transformer 12. If the electric valve 16 be made conductive while the counter-electromotive force of the winding 14 is of such a polarity as to initiate a current in the valve 16 and interrupt the current in the valve 15, that is, while the potential of the right hand terminal is positive with respect to that of the left hand terminal, the current will be commutated from the valve 15 to the valve 16 producing a half cycle of alternating current of opposite polarity in the transformer 12. By use of the phase advancing condenser 22 the grid potential supplied by the transformer 21 will reverse polarity at the proper point in the cycle of alternating potential on the circuit 11 to insure a sufficient commutating voltage. However, under short circuit conditions on the alternating current circuit 11, the terminal voltage of the dynamo-electric machine 18 which supplies the counter-electromotive force effective to commutate the current between the valves 15 and 16 tends to be reduced to zero, or at least below the value necessary for commutation. Under such conditions, the current will not be interrupted in one of the valves when the next valve is made conductive with the result that unidirectional current will flow through both of the valves in parallel saturating the transformer 12 and constituting a short circuit on the direct current circuit 10. Such a result is avoided by the reactance devices 23 which are effective to maintain a predetermined minimum voltage on the alternating current circuit of the inverting apparatus even under short circuit conditions on the alternating current circuit 11, and thus maintain a sufficient voltage for commutating the current between the valves of the inverting apparatus.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In combination, a direct current supply circuit, an alternating current load circuit, vapor electric valve inverting apparatus of the parallel type interconnecting said circuits to transmit energy from said direct current circuit to said alternating current circuit, a dynamo-electric machine connected in parallel with the alternating current circuit of said inverting apparatus to supply a commutating voltage therefor, and means for maintaining a substantial commutating voltage under abnormal load conditions tending to reduce the commutating voltage to zero.

2. In combination, a direct current supply circuit, an alternating current load circuit, vapor electric valve inverting apparatus of the parallel type interconnecting said circuits to transmit energy from said direct current circuit to said alternating current circuit, a dynamo-electric machine connected in parallel with the alternating current circuit of said inverting apparatus to supply a commutating voltage therefor, and means for maintaining a predetermined commutating voltage under short circuit conditions on said load circuit tending to reduce the commutating voltage to zero.

3. In combination, a direct current supply circuit, an alternating current load circuit, vapor electric valve inverting apparatus of the parallel type interconnecting said circuits to transmit energy from said direct current circuit to said alternating current circuit, a synchronous generator connected in parallel with the alternating current circuit of said inverting apparatus for supplying a commutating voltage therefor and a portion of the load, and reactance means interposed between said alternating current load circuit and the parallel connected inverting apparatus and generator for maintaining a substantial commutating voltage under abnormal load conditions.

EUGEN HOROWICZ.